United States Patent [19]
Nicolin et al.

[11] Patent Number: 5,111,662
[45] Date of Patent: May 12, 1992

[54] GAS/STEAM POWER STATION PLANT

[75] Inventors: Curt Nicolin, Grodinge, Sweden; Hans-Ulrich Frutschi, Riniken; Giacomo Bolis, Zurich, both of Switzerland

[73] Assignee: Asea Brown Boveri Ltd., Baden, Switzerland

[21] Appl. No.: 599,737

[22] Filed: Oct. 19, 1990

[30] Foreign Application Priority Data

Oct. 24, 1989 [CH] Switzerland .................. 3839/89

[51] Int. Cl.⁵ .......................................... F01K 23/10
[52] U.S. Cl. ................................ 60/655; 60/39.182; 60/618; 60/676
[58] Field of Search ............... 60/39.182, 655, 618, 60/676

[56] References Cited

U.S. PATENT DOCUMENTS 3,172,258  3/1965  Pacault .
4,133,567  1/1979  McGann .................. 60/39.182

FOREIGN PATENT DOCUMENTS 561251   10/1957  Belgium .
640192    5/1964  Belgium .
1522414   4/1968  France .

*Primary Examiner*—Allen M. Ostrager
*Attorney, Agent, or Firm*—Burns, Doane, Swecker & Mathis

[57] ABSTRACT

In a gas/steam power station plant, which consists essentially of at least one fossil-fired internal combustion engine (2), at least one steam circuit (1) and at least one heat exchanger (3), the heat exchanger (3) connected downstream of the internal combustion engine (2) is fed with exhaust gases (27) from the internal combustion engine (2). Together with a number of steam turbines (12, 13), the steam circuit 1 has a generator (14), a series of other auxiliary units (15, 16) and a water-cooled reactor (11) which produces an amount of saturated steam (B) from an amount of preheated feed water (C) treated in the heat exchanger (3) and fed to it. This amount of saturated steam is thereupon fed to a superheat stage (A) in the heat exchanger (3), where the actual final treatment of the steam takes place.

12 Claims, 4 Drawing Sheets

GAS/STEAM POWER STATION PLANT

DESCRIPTION

The present invention relates to a gas/steam power station plant and to methods of operating a plant of this kind.

TECHNICAL FIELD AND PRIOR ART

In the case of a nuclear power station plant having a water-cooled reactor, only saturated steam at modest pressure can be produced. In accordance with the present state of development a reactor of this kind works with modest steam data, for example at 63 bar and 280 degrees Celsius, and thus achieves a conversion efficiency of about 33% of the energy produced in the reactor into electric energy.

It is obvious that a conversion efficiency of this kind is no longer able to satisfy the operating economy expected at the present time in the production of energy.

In the case of solely fossil-fired power station plants it is the state of the art practice to extend a gas turbine plant with a waste-heat steam generator (= waste-heat boiler) and to combine it with a steam turbine plant connected downstream, although fossil-fired steam power stations can achieve efficiencies of over 40%.

These so-called combination plants are then distinguished by very good conversion efficiencies, which range in order of magnitude from 50 to 52%. These high efficiencies result from the cooperation of a gas turbo unit with at least one steam turbine circuit, the gas turbine exhaust gases being passed through a waste-heat boiler in which the residual heat potential of precisely these waste gases is utilized for producing the steam required for feeding a steam turbine.

In such combination plants it is found that the evaporation of the feed water, which proceeds isothermally, in a waste-heat boiler naturally occurs with declining temperature of the waste gases, while on average an unnecessarily high temperature difference results. This gives rise to undoubtedly unnecessary additional losses of energy (losses of work capacity of the waste gases), which, considered graphically in a T/Q diagram, can be represented as the area between the steep temperature fall curve of the waste gases in the waste-heat boiler and the flat evaporation curve of the feed water.

It is true that a correction can be made by using a multipressure waste-heat boiler. However, more than two pressure stages are not easily handled either in respect of design or in respect of operation, so that even with the aid of a waste-heat boiler of this kind the energy losses cannot be reduced to the desired extent.

Problem Underlying the Invention

The invention seeks to provide a remedy in this connection. The problem underlying the invention, as the latter is characterized in the claims, is that of minimizing energy losses in evaporation in a gas/steam power station plant of the kind first mentioned above.

The essential advantages of the invention are to be seen in that the evaporation process making optimum use of the energy potential of the thermally offered power of a nuclear reactor is backed up by feed water preheating and steam superheating in the waste-heat boiler of a gas turbine. Since both the feed water preheating and the steam superheating take place countercurrently to the flue gas cooling, there are in fact naturally no energy losses exceeding the extent necessary for heat transfer. All in all, over the entire range of heat supply, which is split up into a nuclear and a fossil part, the smallest possible energy losses, and therefore the smallest possible efficiency loss in the conversion of heat into electricity as the result of poor thermal impedance adaptation, will thus occur. However, the fact that this applies particularly to the fossil part of the energy supplied is of decisive importance because the environmental load through fossil fuels is thus reduced to a minimum. If natural gas is used, additional fossil-produced electric energy can be obtained with minimum emission of carbon dioxide.

Further advantages of the invention arise in connection with an increase of the power of an existing nuclear power station plant if a number of internal combustion engines, preferably gas turbine plants, are connected upstream of the nuclear power station plant.

If in the last-mentioned configuration the corrective intervention in respect of the absorption capacity of the steam turbines and the power capacity of the generator should remain slight or be completely absent, it is possible to provide a circuit arrangement in which the excess steam fraction is branched off from the superheat stage in the heat exchanger and passed to the circuit of the internal combustion engines, preferably into their combustion chambers, and it is there ensured that the resulting loss of power in the steam circuit of the nuclear power plant is approximately compensated by the increase of power of the internal combustion engines.

Another advantage of the invention relates to the adaptability of the circuit arrangement. With a quantitatively and/or thermally reduced potential of the exhaust gases provided by the internal combustion engines, the nominal power of the reactor need not be reduced. It is in fact entirely possible for only a part of the feed water flow coming from the condenser to be preheated in the waste-heat boiler and also to superheat therein only a part of the steam produced in the reactor, so that a correspondingly smaller gas turbine plant can be installed. Nevertheless, the fossil part of the energy required for this purpose is converted with the improved efficiency prognosticated above.

A further advantage of the invention is to be seen in the fact that the circuit arrangement has great expansibility and combinability, such as using the potential of the preheat stage in the waste-heat boiler to the required extent for operating an outside heat consumer.

Advantageous and expedient further developments of the solution to the problem supplied by the invention are characterized in the other dependent claims.

Examples of embodiment of the invention are schematically illustrated in the drawing and explained more fully below. All elements not necessary for immediate understanding of the invention have been omitted. The direction of flow of the media is indicated by arrows. In the various figures identical elements are in each case given the same references.

DESCRIPTION OF THE EXAMPLES OF EMBODIMENT

Figure 1:
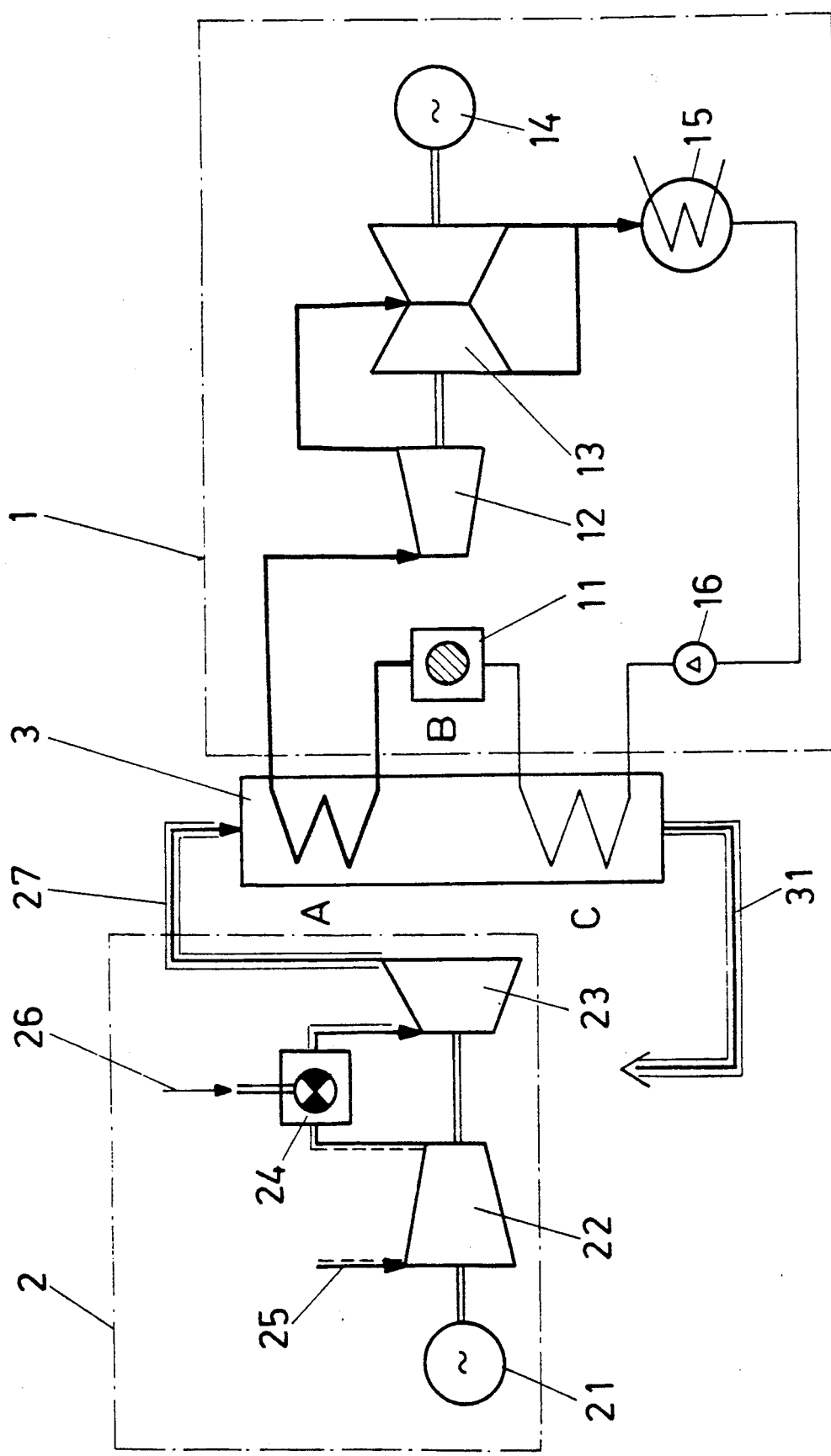
FIG. 1 shows a circuit arrangement of a power station plant which consists of the cooperation of a gas turbine plant and a nuclear power station plant.

FIG. 1 shows a circuit arrangement of a power station plant which consists of the cooperation of a nuclear power station plant 1 with a gas turbine plant 2, a waste-heat boiler 3 being interposed between the two blocks. The gas turbine plant 2 connected upstream of the waste-heat boiler 3 and of the nuclear power station plant 1 consists essentially of a compressor 22, a gas turbine 23 preferably mounted on a common shaft with said compressor, a generator 21 coupled to the rotation of these two machines, and a combustion chamber 24. The induced air 25 is passed into the compressor 22, where the compression takes place, and this compressed air then flows into the combustion chamber 24. The fuel 26 for operating the combustion chamber 24 consists of gaseous and/or liquid fuels. The hot gases produced in the combustion chamber 24 pass in the following process into the gas turbine 23; after their expansion these hot gases, whose pressure has been consumed, flow as waste gases 27 through the waste-heat boiler 3, in which their residual thermal potential is further utilized. The nuclear power station plant 1 consists of a light water reactor 11, which supplies an amount of saturated steam, and further of a high pressure steam turbine 12 and, connected downstream thereof, a low pressure steam turbine 13. A generator 14 is coupled to the steam turbines. By way of one or more exhaust steam pipes the expanded steam flows out of the low pressure steam turbine 13 into a preferably water- or air-cooled condenser 15. The condensate formed therefrom is passed via a pump 16 into the waste-heat boiler 3, where via stage C it undergoes preheating to feed water. The next stage of the process consists in that the feed water is passed into the reactor 11, where the actual treatment of steam to form a saturated steam B takes place. After this treatment stage in the reactor 11 the saturated steam is passed once more into the waste-heat boiler 3, where via another heat transfer stage the final treatment of the steam to form a superheated steam A takes place. This steam treated with a maximized thermal potential then passes into the high pressure steam turbine 12 and then into the low pressure steam turbine 13, the two turbines producing the electric power of the generator 14 coupled there. After the waste gases 27 have substantially given up their heat potential in the waste-heat boiler 3, they flow off as flue gases 31 through a chimney (not shown).

Optionally, an additional furnace (not shown) may be connected upstream of the waste-heat boiler 3 to bring the waste gases 27 to a higher heat-exchangeable temperature. A measure of this kind, although it increases the producible electric power, nevertheless reduces conversion efficiency.

As a quantitative example of embodiment, a nuclear power station plant containing a light water reactor 11 for a thermal power of 3000 MW will be considered. In order to bring the feed water preheating in stage C to 220 degrees Celsius and the steam heating in stage A of the saturated steam produced in the reactor 11 at 280 degrees Celsius boiling temperature finally in stage B to 480 degrees Celsius, there must be in the waste-heat boiler 3 a flue gas mass flow which exceeds the live steam mass flow by a factor of 2.75. The gas turbines used in this example each have a flue gas mass flow of 500 kg/s and each produces 141 MWe. Their conversion efficiency amounts to 33.6%. In order to superheat the live steam mass flow from the reactor 11 of 1627 kg/s and to preheat the feed water, a total waste gas mass flow of 4480 kg/s is necessary. Nine gas turbines are required for this purpose, which together produce a power of 1269 MWe. Since the steam turbines 12 and 13, if necessary after appropriate adaptation, work with superheated steam and no further amount of steam has to be taken from them for feed water preheating, they produce together 1710 MWe. The integration of the gas turbine plant 2, with its number of gas turbines, into the nuclear power station plant 1 thus permits a total power of 3000 MWe, as compared with 1000 MWe from the original nuclear power station plant.

The 3779 MWth of fossil fuel expenditure for all gas turbines are converted into electrical energy with an efficiency of 52.4%, because:

$$\eta \text{ th foss} = \Delta P / \Delta \dot{Q}\text{foss} = (Pdt - Pdto + Pgt)/\Delta \dot{Q}\text{foss}$$
$$= (1710 - 1000 + 1269)/3779$$
$$= 0.524.$$

A single nuclear power station, correspondingly combined, would thus make it possible once again to achieve twice the power of the nuclear power station and to do this with very high conversion efficiency, which would mean extremely efficient and therefore environment-friendly utilization of the fossil fuel, preferably natural gas. A circuit arrangement of this kind is particularly interesting in respect of the investment aspect if it is conceived as a retrofit operation for an existing nuclear power station plant.

Even when conceived in this way, the circuit arrangement remains very adaptable; if, for example, the absorption capacity of the steam turbines does not permit absorption of the amount of steam produced, or if the power capacity of the existing generator is at its limit, the excess steam fraction can be branched off from the superheat stage in the waste-heat boiler 3 and passed into the circuit of the gas turbine plants 2, preferably into their combustion chamber 24. The resulting loss of power in the steam circuit of the nuclear power station plant 1 is largely made good by an increase of power of the gas turbine plants 2. In addition, with a reduced potential of waste gases, whether quantitative and/or thermal, the nominal power of the reactor 11 need not be reduced; a part of the amount of saturated steam B from the reactor 11 which cannot be treated in the waste-heat boiler 3 is branched off and fed directly to the steam turbines of the steam circuit of the nuclear power station plant 1. It may then be advantageous for this excess steam fraction, which cannot be superheated by the waste-heat boiler 3, to be throttled and thus, slightly superheated, to be passed into the steam turbines at a suitable point. The two last-mentioned possible circuit arrangements are not shown in FIG. 1, since in the light of the above description they can be recreated without difficulty.

Figure 2:
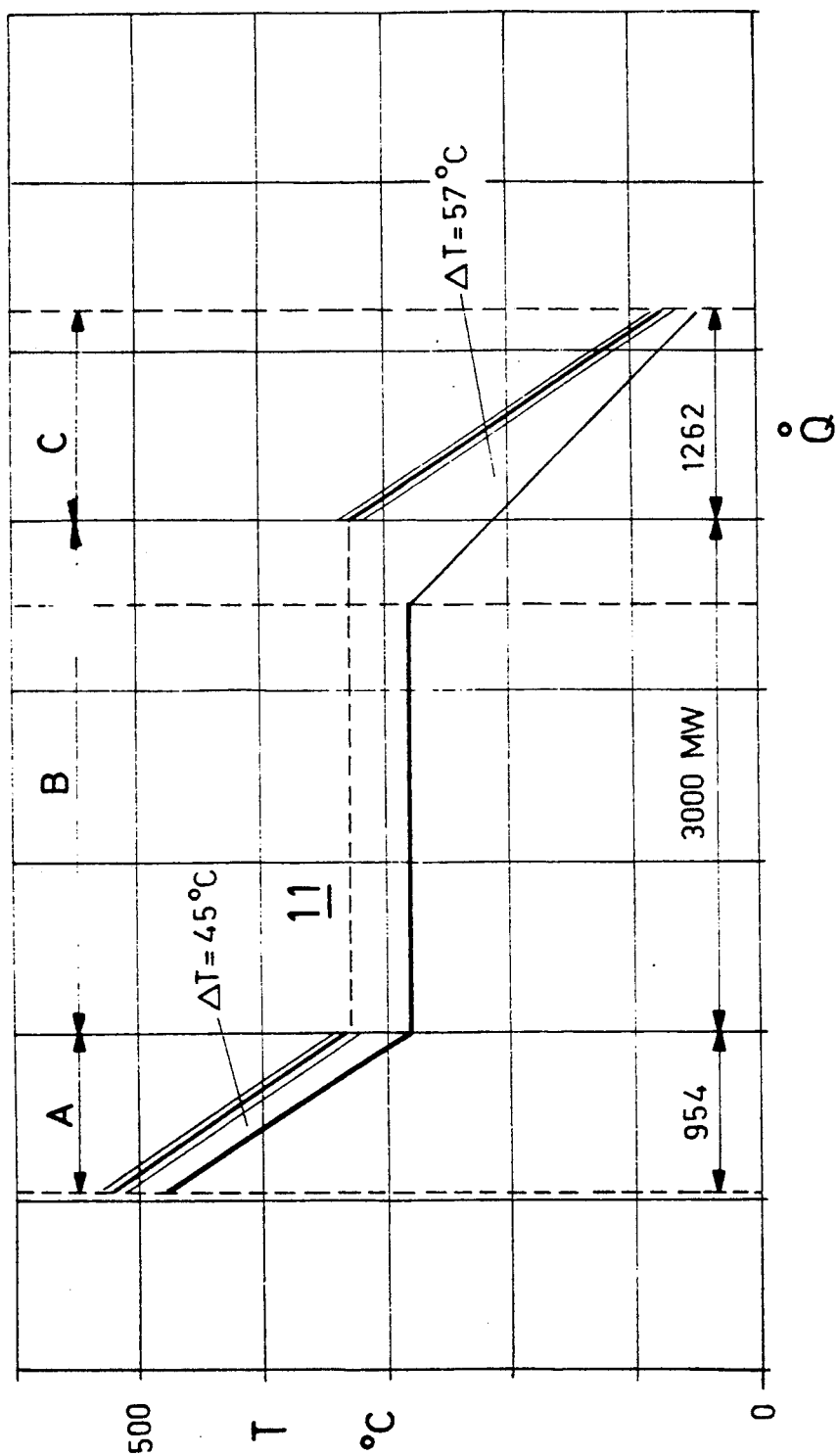
FIG. 2 is a T/Q diagram of the plant shown in FIG. 1.

In FIG. 2 the circuit arrangement shown in FIG. 1 is illustrated diagrammatically. In this connection the minimized energy losses during the evaporation process along stage B, and also during the preheating C and the superheating A, should be noted. Only the temperature differences necessary for heat transfer result therefrom.

Figure 3:
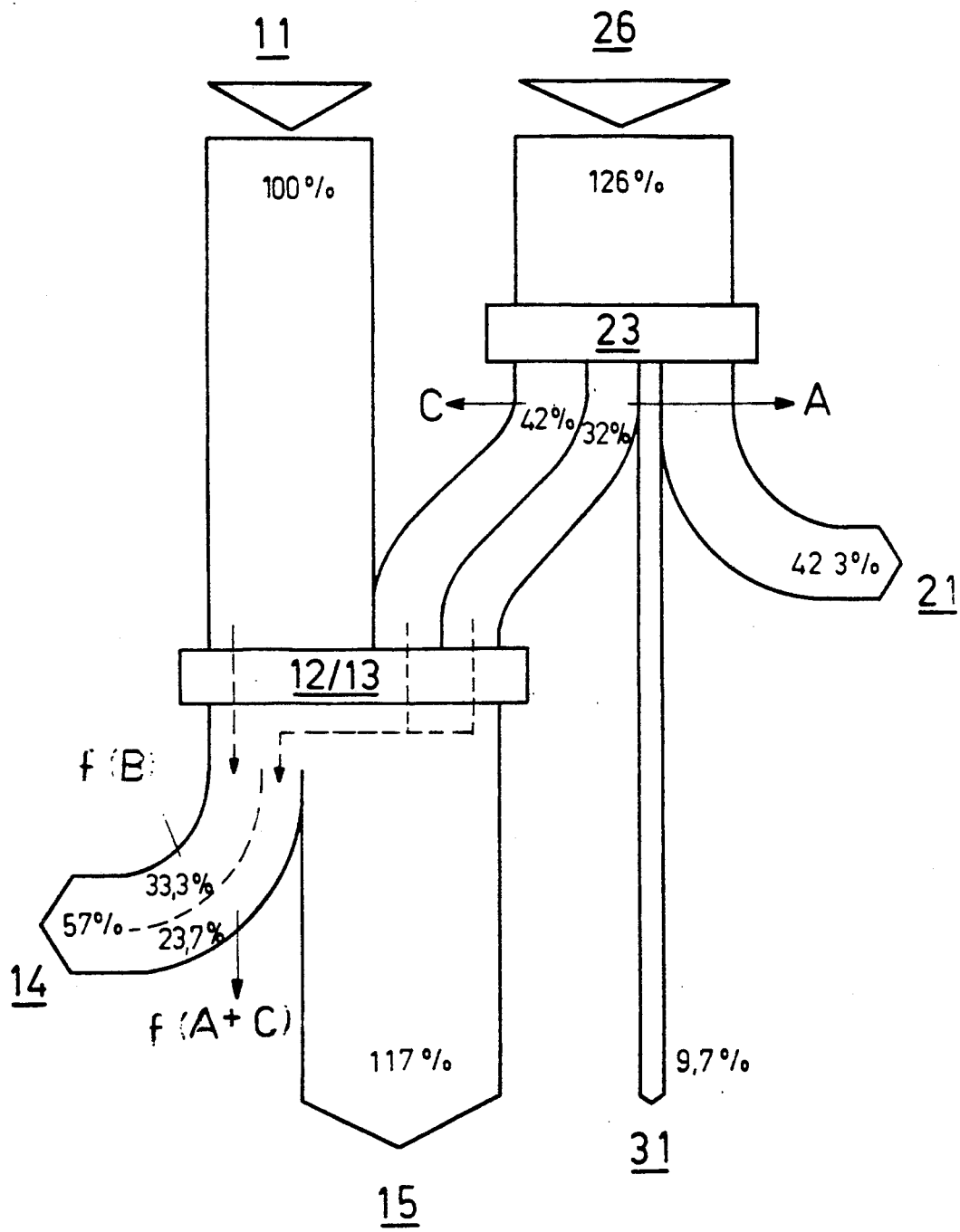
FIG. 3 is a Sankey diagram of the energy flows of the plant shown in FIG. 1.

In FIG. 3 the energy flows are illustrated with the aid of a Sankey diagram. Three efficiencies of conversion of the thermal energy expended into electrical energy can here be distinguished:

a) Efficiency of the nuclear part (FIG. 1, item 1)
$\eta nuk = 1000$ MWe/3000 MWth = 33.3%.

b) Efficiency of the fossil part (FIG. 1, items 2, 3)
$\eta fos = 42.3\% + 23.7\%)/126\% = 52.4\%$.

c) Efficiency of the entire plant (FIG. 1, items 1, 2, 3)
$\eta ges = (57\% + 42.3\%)/(100\% + 126\%) = 43.9\%$.

Figure 4:
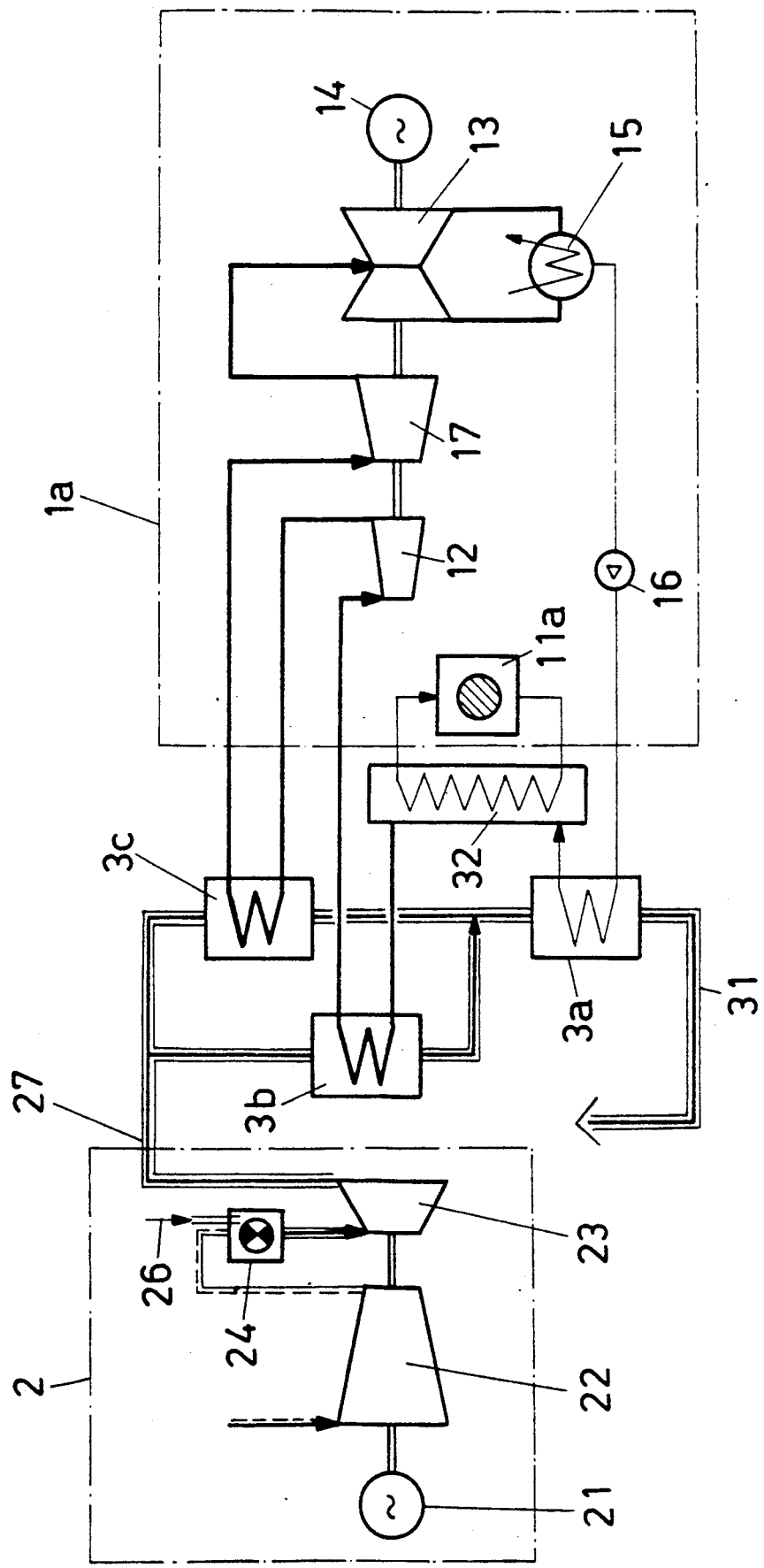
FIG. 4 shows a circuit arrangement of a power station plant with a progressive, future water-cooled reactor paired with a likewise progressive, future gas turbine plant.

If a progressive, future water-cooled reactor is considered, which for example is able to deliver saturated steam at 340 degrees Celsius and at 147 bar, it becomes possible to provide intermediate superheating. If, in addition, this reactor is paired with gas turbines of the next generation, it would be possible to obtain therewith a steam temperature of about 550 degrees Celsius, with the result that the conversion efficiency of the plant would be substantially increased. Under these conditions the concept of a new plant based on the hybrid principle described could even open up interesting prospects. FIG. 4 shows an example of such a circuit arrangement.

The following description of FIG. 4 is restricted to the construction of the circuit arrangement illustrated. Nothing is said regarding the power of the individual machines. The gas turbine plant 2 corresponds in construction to that shown in FIG. 1. In comparison with the latter, the nuclear power station plant 1a is extended in that between the high pressure steam turbine 12 and the low pressure steam turbine 13 a medium pressure steam turbine 17 is interposed. For safety reasons, between the reactor 11a and the waste-heat units an insulating heat exchanger 32 is provided, which constitutes a requirement in connection with the use of a future reactor. This arrangement moreover is in any case a functionally necessary precaution for pressurized water reactors.

The original waste-heat boiler 3 shown in FIG. 1 is here replaced by three individual, independent, dedicated waste-heat units. The condensate from the condenser 15 flows through a preheater 3a, which is connected downstream of a superheater 3b and an intermediate superheater 3c and wherein preheating of the feed water is first effected. The feed water treated in this manner then flows through the previously mentioned insulating heat exchanger 32, which is associated with the reactor 11a and in which the treatment of saturated steam takes place. This medium then flows through the superheater 3b, which is likewise individually fed with waste gases 27 and in which the final thermal treatment of the steam takes place. The superheated steam is then fed in the first operation to the high pressure steam turbine 12. After expansion in this stage the steam is passed through the intermediate superheater 3c, which is likewise fed with waste gases 27 and in which the steam is again subjected to thermal treatment before being passed to the previously-mentioned medium pressure steam turbine 17 forming an intermediate unit between the high pressure and low pressure steam turbines. When the passage through this stage has been completed, the substantially expanded steam flows directly into the low pressure steam turbine 13, where it gives up its residual energy potential. The other steps of the circuit arrangement correspond to the operating sequence illustrated in FIG. 1. With the circuit arrangement assumed here, fossil energy conversion efficiencies of over 60% can be expected. In order to produce saturated steam at a sufficiently high pressure in the heat exchanger 32, such as that necessary for the interposition of intermediate superheating, a very high pressure level is required in the reactor 11a in the case of water cooling. Such a level can be reduced by selecting a high-boiling coolant, for example sodium, or by means of a suitable gas, such as $CO_2$ or He.

By operating the gas turbine plant 2 under nominal conditions with compressor preguide rows 10% closed, the shorter inspection intervals for gas turbines, in comparison with steam turbines, can be bridged over. Applied to the circuit arrangements according to FIG. 1 and possibly FIG. 2, this would mean that for the utilization of the entire preheating and superheating potential ten machines would be necessary. In addition, it would be possible to consider equipping the waste-heat boiler 3 or the waste-heat units 3a, 3b, 3c, or a different configuration of waste-heat units, with an additional furnace, which is not illustrated. By this means the nominal operation of the steam part could be maintained even in the event of a breakdown requiring the shutting down of one or more gas turbine plants 2.

It is obviously also possible in this case to provide the more extensive circuit facilities described in connection with FIG. 1, namely diversion of the excess steam fraction into the circuit of the gas turbine plant 2 or introduction of a fraction of the saturated steam into the steam turbines of the steam circuit of the nuclear power station plant 1a.

We claim:

1. A gas/steam power station plant comprising:
   at least one fossil fuel circuit producing electric power and at least one steam circuit producing electric power;
   said fossil fuel circuit having turbine means receiving combustion gases for operating an electric generator;
   said steam circuit having reactor means for producing saturated steam from feed water and turbine means receiving said saturated steam for operating an electric generator;
   at least one heat exchanger means for heating said feed water and said saturated steam of said steam circuit with exhaust gases of said fossil fuel circuit;
   said at least one heat exchanger means including preheat stage means for preheating at least a portion of said feed water prior to introduction of said feed water to said reactor means; and,
   said at least one heat exchanger means including superheat stage means for superheating at least a portion of said saturated steam prior to introduction of said saturated steam to said turbine means.

2. A gas/steam power station according to claim 1, wherein said reactor means is a water-cooled reactor means.

3. A gas/steam power station according to claim 1, wherein said reactor means includes means for cooling said reactor means with coolant other than water.

4. A gas/steam power station according to claim 1, further including an insulating heat exchanger means disposed between said preheat state of said at least one heat exchanger and said superheat stage means of said at least one heat exchanger.

5. A gas/steam power station according to claim 1, wherein said at least one heat exchanger is a waste-heat boiler.

6. A gas/steam power station according to claim 5, wherein said waste-heat boiler includes an intermediate superheater means for superheating a portion of saturated steam prior to introduction of said saturated steam to an intermediate turbine of said turbine means.

7. A gas/steam power station to claim 1, wherein said fossil fuel circuit includes a gas turbine.

8. A method of operating gas/steam power station plant having a fossil fuel circuit and a steam circuit comprising the steps of:
burning fossil fuel to generate combustion gases and supplying said combustion gases to gas turbine means for operating an electric generator;
directing exhaust gases from said gas turbine means to a heat exchanger;
generating saturated steam from feed water in a reactor and supplying said saturated steam to steam turbine means for operating an electric generator;
preheating at least a portion of said feed water prior to introduction of said feed water to said reactor by supplying said feed water to a preheat stage of said heat exchanger; and,
superheating at least a portion of said saturated steam prior to introduction of said saturated steam to said turbine means by supplying said saturated steam to a superheat stage of said heat exchanger.

9. A method of operating a gas/steam power station according to claim 8, further including the step of diverting a portion of saturated steam that has been superheated to said fossil fuel circuit.

10. A method of operating a gas/steam power station according to claim 8, further including the step of directing a portion of saturated steam from said reactor to said steam turbine means and thereby bypassing said superheat stage of said heat exchanger.

11. A method of operating a gas/steam power station according to claim 8, wherein a potential of said preheat stage is directed to operate a heat consumer separate from said fossil fuel circuit and said steam circuit.

12. A method of operating a gas/steam power station plant according to claim 8, wherein said at least a portion of said feed water supplied to said preheat stage and said at least a portion of said saturated steam supplied to said superheat stage one of different magnitude from each other.

* * * * *